US012576688B2

(12) United States Patent
Vila Soler et al.

(10) Patent No.: US 12,576,688 B2
(45) Date of Patent: Mar. 17, 2026

(54) CLIMATE CONTROLLED VEHICLE, TRANSPORT CLIMATE CONTROL EQUIPMENT, METHOD OF RETROFITTING A VEHICLE AND METHOD OF OPERATION

(71) Applicant: THERMO KING LLC, Minneapolis, MN (US)

(72) Inventors: Joan Vila Soler, Terrassa (ES); Inaki Fernandez Blanco, Barcelona (ES); Jordi Garcia Farran, Minneapolis, MN (US); Josep Rafecas Sabate, Catalunya (ES)

(73) Assignee: THERMO KING LLC, Minneapolis, MN (US)

( * ) Notice: Subject to any disclaimer, the term of this patent is extended or adjusted under 35 U.S.C. 154(b) by 515 days.

(21) Appl. No.: 16/911,692

(22) Filed: Jun. 25, 2020

(65) Prior Publication Data

US 2020/0406705 A1    Dec. 31, 2020

(30) Foreign Application Priority Data

Jun. 28, 2019    (EP) ..................................... 19382554

(51) Int. Cl.
*B60H 1/00*          (2006.01)
*B60H 1/32*          (2006.01)

(52) U.S. Cl.
CPC ....... *B60H 1/00428* (2013.01); *B60H 1/0025* (2013.01); *B60H 1/3232* (2013.01); *B60H 1/00014* (2013.01)

(58) Field of Classification Search
CPC .......................... B60H 1/00428; B60H 1/0025; B60H 1/3232; B60H 1/00014; B60H 1/00735
See application file for complete search history.

(56) References Cited

U.S. PATENT DOCUMENTS 3,875,483  A      4/1975   Farr
5,104,037  A      4/1992   Karg et al.
            (Continued)

FOREIGN PATENT DOCUMENTS

CN          2456117        10/2001
CN          1885660        12/2006
                (Continued)

OTHER PUBLICATIONS

Yang et al., "The Role of Thermal Plume in Person-to-Person Contaminant Cross Transmission", 2017 Winter Conference, Seminar 36; Modeling and Control of the Personal Microenvironment, 5 pages.

(Continued)

*Primary Examiner* — Tavia Sullens
(74) *Attorney, Agent, or Firm* — HSML P.C.

(57)              ABSTRACT

There is disclosed a climate controlled vehicle 11 comprising: a prime mover 21; a transport climate control unit 14; a vehicle power network 204 comprising: an alternator 205 configured to be driven by the prime mover when the prime mover is active, a primary battery 210 electrically connected to the alternator for charging; a secondary battery 211 electrically connected to the alternator for charging; power supply terminals 207 connecting the vehicle power network to the transport climate control unit; a switch 206 having a closed configuration in which the primary battery and the second battery are electrically coupled to the alternator for charging and an open configuration in which the secondary battery and the power supply terminals are isolated from the primary battery to prevent power supply from the primary battery to the transport climate control unit. The transport climate control unit is connected to the power supply terminals of the vehicle power network to receive power from the alternator when the prime mover is active and the (Continued)

switch is closed, and to receive power from the secondary battery when the prime mover is inactive and the switch is open. A controller 260 is configured to determine whether to maintain operation of the transport climate control unit or to deactivate the transport climate control unit, based on a power setting for the transport climate control unit.

15 Claims, 9 Drawing Sheets

(56) References Cited

U.S. PATENT DOCUMENTS

| | | | |
|---|---|---|---|
| 6,280,320 B1 | 8/2001 | Paschke et al. | |
| 6,487,869 B1 | 12/2002 | Sulc et al. | |
| 6,518,727 B2 | 2/2003 | Oomura et al. | |
| 6,560,980 B2 | 5/2003 | Gustafson et al. | |
| 6,600,237 B1 | 7/2003 | Meissner | |
| 6,631,080 B2 | 10/2003 | Trimble et al. | |
| 6,688,125 B2 | 2/2004 | Okamoto et al. | |
| 6,753,692 B2 | 6/2004 | Toyomura et al. | |
| 7,011,902 B2 | 3/2006 | Pearson | |
| 7,120,539 B2 | 10/2006 | Krull et al. | |
| 7,122,923 B2 | 10/2006 | Lafontaine et al. | |
| 7,151,326 B2 | 12/2006 | Jordan | |
| 7,176,658 B2 | 2/2007 | Quazi et al. | |
| 7,206,692 B2 | 4/2007 | Beesley et al. | |
| 7,327,123 B2 | 2/2008 | Faberman et al. | |
| 7,424,343 B2 | 9/2008 | Kates | |
| 7,449,798 B2 | 11/2008 | Suzuki et al. | |
| 7,532,960 B2 | 5/2009 | Kumar | |
| 7,728,546 B2 | 6/2010 | Tanaka et al. | |
| 7,730,981 B2 | 6/2010 | McCabe et al. | |
| 7,745,953 B2 | 6/2010 | Puccetti et al. | |
| 7,806,796 B2 | 10/2010 | Zhu | |
| 7,830,117 B2 | 11/2010 | Ambrosio et al. | |
| 7,898,111 B1 | 3/2011 | Pistel | |
| 7,900,462 B2 | 3/2011 | Hegar et al. | |
| 8,020,651 B2 | 9/2011 | Zillmer et al. | |
| 8,030,880 B2 | 10/2011 | Alston et al. | |
| 8,170,886 B2 | 5/2012 | Luff | |
| 8,214,141 B2 | 7/2012 | Froeberg | |
| 8,295,950 B1 | 10/2012 | Wordsworth et al. | |
| 8,381,540 B2 | 2/2013 | Alston | |
| 8,441,228 B2 * | 5/2013 | Brabec | H02J 7/342 |
| | | | 180/65.21 |
| 8,476,872 B2 | 7/2013 | Truckenbrod et al. | |
| 8,487,458 B2 | 7/2013 | Steele et al. | |
| 8,541,905 B2 | 9/2013 | Brabee | |
| 8,602,141 B2 | 12/2013 | Yee et al. | |
| 8,626,367 B2 | 1/2014 | Krueger et al. | |
| 8,626,419 B2 | 1/2014 | Mitchell et al. | |
| 8,643,216 B2 | 2/2014 | Lattin | |
| 8,643,217 B2 | 2/2014 | Gietzold et al. | |
| 8,670,225 B2 | 3/2014 | Nunes | |
| 8,723,344 B1 | 5/2014 | Dierickx | |
| 8,760,115 B2 | 6/2014 | Kinser et al. | |
| 8,764,469 B2 | 7/2014 | Lamb | |
| 8,818,588 B2 | 8/2014 | Ambrosio et al. | |
| 8,862,356 B2 | 10/2014 | Miller | |
| 8,924,057 B2 | 12/2014 | Kinser et al. | |
| 8,978,798 B2 | 3/2015 | Dalum et al. | |
| 9,030,336 B2 | 5/2015 | Doyle | |
| 9,061,680 B2 | 6/2015 | Dalum | |
| 9,093,788 B2 | 7/2015 | Lamb | |
| 9,102,241 B2 | 8/2015 | Brabee | |
| 9,147,335 B2 | 9/2015 | Raghunathan et al. | |
| 9,199,543 B2 | 12/2015 | Brabee | |
| 9,313,616 B2 | 4/2016 | Mitchell et al. | |
| 9,436,853 B1 | 9/2016 | Meyers | |
| 9,440,507 B2 | 9/2016 | Giovanardi et al. | |
| 9,463,681 B2 | 10/2016 | Olaleye et al. | |
| 9,464,839 B2 | 10/2016 | Rusignuolo et al. | |
| 9,557,100 B2 | 1/2017 | Chopko et al. | |
| 9,562,715 B2 | 2/2017 | Kandasamy | |
| 9,694,697 B2 | 7/2017 | Brabee | |
| 9,738,160 B2 | 8/2017 | Bae et al. | |
| 9,758,013 B2 | 9/2017 | Steele | |
| 9,783,024 B2 | 10/2017 | Connell et al. | |
| 9,784,780 B2 | 10/2017 | Loftus et al. | |
| 9,825,549 B2 | 11/2017 | Choi et al. | |
| 9,846,086 B1 | 12/2017 | Robinson et al. | |
| 9,893,545 B2 | 2/2018 | Bean | |
| 9,931,960 B2 | 4/2018 | Tabatowski-Bush et al. | |
| 9,975,403 B2 | 5/2018 | Rusignuolo et al. | |
| 9,975,446 B2 | 5/2018 | Weber et al. | |
| 9,987,906 B2 | 6/2018 | Kennedy | |
| 10,000,122 B2 | 6/2018 | Wu et al. | |
| 10,148,212 B2 | 12/2018 | Schumacher et al. | |
| 10,240,847 B1 | 3/2019 | Thomas, Jr. | |
| 2002/0113576 A1 | 8/2002 | Oomura et al. | |
| 2003/0043607 A1 | 3/2003 | Vinciarelli et al. | |
| 2003/0106332 A1 | 6/2003 | Okamoto et al. | |
| 2003/0200017 A1 | 10/2003 | Capps et al. | |
| 2005/0057210 A1 | 3/2005 | Ueda et al. | |
| 2006/0284601 A1 | 12/2006 | Salasoo et al. | |
| 2007/0052241 A1 | 3/2007 | Pacy | |
| 2007/0131408 A1 | 6/2007 | Zeigler et al. | |
| 2007/0192116 A1 | 8/2007 | Levitt | |
| 2008/0014852 A1 * | 1/2008 | Mielke | B60H 1/00428 |
| | | | 454/75 |
| 2008/0023965 A1 | 1/2008 | Cagliari et al. | |
| 2009/0121798 A1 | 5/2009 | Levinson | |
| 2009/0126901 A1 | 5/2009 | Hegar et al. | |
| 2009/0178424 A1 | 7/2009 | Hwang et al. | |
| 2009/0195349 A1 | 8/2009 | Frader-Thompson et al. | |
| 2009/0229288 A1 | 9/2009 | Alston et al. | |
| 2009/0314019 A1 | 12/2009 | Fujimoto et al. | |
| 2009/0320515 A1 | 12/2009 | Bischofberger et al. | |
| 2010/0230224 A1 | 9/2010 | Hindman | |
| 2010/0312425 A1 | 12/2010 | Obayashi et al. | |
| 2010/0320018 A1 | 12/2010 | Gwozdek et al. | |
| 2011/0000244 A1 | 1/2011 | Reason et al. | |
| 2011/0114398 A1 | 5/2011 | Bianco | |
| 2011/0208378 A1 | 8/2011 | Krueger et al. | |
| 2011/0224841 A1 | 9/2011 | Profitt-Brown et al. | |
| 2011/0241420 A1 | 10/2011 | Hering et al. | |
| 2012/0000212 A1 | 1/2012 | Sanders et al. | |
| 2012/0116931 A1 | 5/2012 | Meyers | |
| 2012/0198866 A1 | 8/2012 | Zeidner | |
| 2012/0310416 A1 | 12/2012 | Tepper et al. | |
| 2013/0000342 A1 | 1/2013 | Blasko et al. | |
| 2013/0088900 A1 | 4/2013 | Park | |
| 2013/0158828 A1 | 6/2013 | McAlister | |
| 2013/0231808 A1 | 9/2013 | Flath et al. | |
| 2014/0026599 A1 | 1/2014 | Rusignuolo et al. | |
| 2014/0060097 A1 | 3/2014 | Perreault | |
| 2014/0230470 A1 | 8/2014 | Cook | |
| 2014/0265560 A1 | 9/2014 | Leehey et al. | |
| 2015/0081212 A1 | 3/2015 | Mitchell et al. | |
| 2015/0188360 A1 | 7/2015 | Doane et al. | |
| 2015/0231948 A1 | 8/2015 | Kennedy | |
| 2015/0246593 A1 | 9/2015 | Larson et al. | |
| 2015/0355288 A1 | 12/2015 | Yokoyama et al. | |
| 2015/0360568 A1 | 12/2015 | Champagne et al. | |
| 2016/0011001 A1 | 1/2016 | Emory et al. | |
| 2016/0035152 A1 | 2/2016 | Kargupta | |
| 2016/0280040 A1 | 9/2016 | Connell et al. | |
| 2016/0285416 A1 | 9/2016 | Tiwari et al. | |
| 2016/0377309 A1 | 12/2016 | Abiprojo et al. | |
| 2017/0030728 A1 | 2/2017 | Baglino et al. | |
| 2017/0057323 A1 | 3/2017 | Neu et al. | |
| 2017/0063248 A1 | 3/2017 | Lee et al. | |
| 2017/0098954 A1 | 4/2017 | Ferguson et al. | |
| 2017/0217280 A1 | 8/2017 | Larson et al. | |
| 2017/0259764 A1 | 9/2017 | Da Silva Carvalho et al. | |
| 2017/0302200 A1 | 10/2017 | Marcinkiewicz | |
| 2017/0349078 A1 | 12/2017 | Dziuba et al. | |
| 2018/0001739 A1 * | 1/2018 | Vehr | B60H 1/00428 |
| 2018/0029436 A1 | 2/2018 | Zaeri et al. | |
| 2018/0029488 A1 | 2/2018 | Sjödin | |
| 2018/0111441 A1 | 4/2018 | Menard et al. | |
| 2018/0154723 A1 | 6/2018 | Anderson et al. | |
| 2018/0170398 A1 | 6/2018 | Miller et al. | |

(56) References Cited

U.S. PATENT DOCUMENTS

| | | | |
|---|---|---|---|
| 2018/0201092 A1 | 7/2018 | Ahuja et al. | |
| 2018/0203443 A1 | 7/2018 | Newman | |
| 2018/0222278 A1 | 8/2018 | Mizuma | |
| 2018/0342876 A1 | 11/2018 | Agnew et al. | |
| 2018/0342877 A1 | 11/2018 | Yoo et al. | |
| 2018/0356870 A1 | 12/2018 | Rusignuolo | |
| 2019/0086138 A1 | 3/2019 | Chopko et al. | |
| 2019/0092122 A1 | 3/2019 | Vanous et al. | |
| 2019/0123544 A1 | 4/2019 | Pelegris et al. | |
| 2019/0184838 A1 | 6/2019 | Lee et al. | |
| 2019/0255914 A1 | 8/2019 | Ikeda et al. | |
| 2019/0283541 A1 | 9/2019 | Adetola et al. | |
| 2020/0086712 A1 | 3/2020 | Schumacher et al. | |
| 2020/0086744 A1 | 3/2020 | Schumacher et al. | |
| 2020/0101820 A1 | 4/2020 | Wenger et al. | |

FOREIGN PATENT DOCUMENTS

| | | |
|---|---|---|
| CN | 2912069 | 6/2007 |
| CN | 101713577 | 5/2010 |
| CN | 202038315 | 11/2011 |
| CN | 104539184 | 4/2015 |
| CN | 104734178 | 6/2015 |
| CN | 105711376 | 6/2016 |
| CN | 106184252 | 12/2016 |
| CN | 106414125 | 2/2017 |
| CN | 106766419 | 5/2017 |
| CN | 106774131 | 5/2017 |
| CN | 108074466 | 5/2018 |
| CN | 108931006 | 12/2018 |
| CN | 208306320 | 1/2019 |
| CN | 208650989 | 3/2019 |
| DE | 3817365 | 11/1989 |
| DE | 29715576 | 12/1997 |
| DE | 10138750 | 2/2003 |
| DE | 10200637 | 10/2003 |
| DE | 102011050719 | 12/2012 |
| EP | 0282051 | 9/1988 |
| EP | 1935712 | 6/2008 |
| EP | 2365915 | 9/2011 |
| EP | 2689944 | 1/2014 |
| EP | 2717016 | 9/2014 |
| EP | 3343728 | 7/2018 |
| EP | 3536552 | 9/2019 |
| EP | 3540340 | 9/2019 |
| GB | 2551999 | 1/2018 |
| JP | 2000158930 | 6/2000 |
| JP | 2007320352 | 12/2007 |
| JP | 2009243780 | 10/2009 |
| JP | 2019145521 | 8/2019 |
| KR | 10-2012-0092834 | 8/2012 |
| WO | 03038988 | 5/2003 |
| WO | 2010065476 | 6/2010 |
| WO | 2011066468 | 6/2011 |
| WO | 2012138497 | 10/2012 |
| WO | 2013096084 | 6/2013 |
| WO | 2014002244 | 1/2014 |
| WO | 2014058610 | 4/2014 |
| WO | 2014085672 | 6/2014 |
| WO | 2014106060 | 7/2014 |
| WO | 2014106068 | 7/2014 |
| WO | 2016145107 | 9/2016 |
| WO | 2017058660 | 4/2017 |
| WO | 2017172484 | 10/2017 |
| WO | 2017172855 | 10/2017 |
| WO | 2017176682 | 10/2017 |
| WO | 2017176725 | 10/2017 |
| WO | 2017176729 | 10/2017 |
| WO | 2017189485 | 11/2017 |
| WO | 2017218909 | 12/2017 |
| WO | 2017218910 | 12/2017 |
| WO | 2017218912 | 12/2017 |
| WO | 2018005957 | 1/2018 |
| WO | 2018009646 | 1/2018 |
| WO | 2018009798 | 1/2018 |
| WO | 2018017818 | 1/2018 |
| WO | 2018029502 | 2/2018 |
| WO | 2018204591 | 11/2018 |
| WO | 2018226389 | 12/2018 |
| WO | 2018226649 | 12/2018 |
| WO | 2018226848 | 12/2018 |
| WO | 2018226857 | 12/2018 |
| WO | 2018226862 | 12/2018 |
| WO | 2018226906 | 12/2018 |
| WO | 2018226981 | 12/2018 |
| WO | 2018226986 | 12/2018 |
| WO | 2019051086 | 3/2019 |
| WO | 2019151947 | 8/2019 |
| WO | 2020068446 | 4/2020 |
| WO | 2020068450 | 4/2020 |
| WO | 2020068469 | 4/2020 |
| WO | 2020068475 | 4/2020 |
| WO | 2020068502 | 4/2020 |
| WO | 2020068556 | 4/2020 |
| WO | 2020068641 | 4/2020 |
| WO | 2020068646 | 4/2020 |
| WO | 2020069107 | 4/2020 |

OTHER PUBLICATIONS

"Lamberet Smart Reefer on Solutrans", ZOEKEN, Jul. 28, 2015, 7 pages, available at: https://iepieleaks.nl/lamberet-smart-reefer-solutrans/.

U.S. Appl. No. 16/178,067, titled "Methods and Systems for Generation and Utilization of Supplemental Stored Energy for Use in Transport Climate Control", filed Nov. 1, 2018, 35 pages.

U.S. Appl. No. 16/565,063, titled "System and Method for Managing Power and Efficiently Sourcing a Variable Voltage for a Transport Climate Control System", filed Sep. 9, 2019, 59 pages.

U.S. Appl. No. 16/574,754, titled "Methods and Systems for Energy Management of a Transport Climate Control System", filed Sep. 18, 2019, 50 pages.

U.S. Appl. No. 16/574,775, titled "Methods and Systems for Power and Load Management of a Transport Climate Control System", filed Sep. 18, 2019, 68 pages.

European Patent Application No. 18382672.6, titled "Methods and Systems for Energy Management of a Transport Climate Control System", filed Sep. 19, 2018, 50 pages.

European Patent Application No. 18382673.4 titled "Methods and Systems for Power and Load Management of a Transport Climate Control System", filed Sep. 19, 2018, 68 pages.

U.S. Appl. No. 16/176,802, titled "Methods and Systems for Controlling a Mild Hybrid System That Powers a Transport Climate Control System", filed Oct. 31, 2018, 31 pages.

U.S. Appl. No. 16/176,720, titled "Methods and Systems for Augmenting a Vehicle Powered Transport Climate Control System", filed Oct. 31, 2018, 33 pages.

U.S. Appl. No. 16/176,667, titled "Drive Off Protection System and Method for Preventing Drive Off", filed Oct. 31, 2018, 41 pages.

U.S. Appl. No. 16/176,602, titled "Reconfigurable Utility Power Input With Passive Voltage Booster", filed Oct. 31, 2018, 39 pages.

U.S. Appl. No. 16/147,704, titled "Methods and Systems for Monitoring and Displaying Energy Use and Energy Cost of a Transport Vehicle Climate Control System or a Fleet of Transport Vehicle Climate Control Systems", filed Sep. 29, 2018, 33 pages.

U.S. Appl. No. 16/235,865, titled "Methods and Systems for Preserving Autonomous Operation of a Transport Climate Control System", filed Dec. 28, 2018, 50 pages.

PCT International Application No. PCT/US2018/068136, titled "Methods and Systems for Providing Predictive Energy Consumption Feedback for Powering a Transport Climate Control System", filed Dec. 31, 2018, 34 pages.

PCT International Application No. PCT/US2018/068129, titled "Methods and Systems for Notifying and Mitigating a Suboptimal Event Occurring in a Transport Climate Control System", filed Dec. 31, 2018, 44 pages.

PCT International Application No. PCT/US2018/068139, titled "Methods and Systems for Providing Feedback for a Transport Climate Control System", filed Dec. 31, 2018, 37 pages.

(56) References Cited

OTHER PUBLICATIONS

PCT International Application No. PCT/US2018/068142, titled "Methods and Systems for Providing Predictive Energy Consumption Feedback for Powering a Transport Climate Control System Using External Data", filed Dec. 31, 2018, 39 pages.

U.S. Appl. No. 16/236,938, titled "Systems and Methods for Smart Load Shedding of a Transport Vehicle While in Transit", filed Dec. 31, 2018, 39 pages.

U.S. Appl. No. 16/565,110, titled "Transport Climate Control System With a Self-Configuring Matrix Power Converter", filed Sep. 9, 2019, 52 pages.

U.S. Appl. No. 16/565,146, titled "Optimized Power Management for a Transport Climate Control Energy Source", filed Sep. 9, 2019, 53 pages.

U.S. Appl. No. 62/897,833, titled "Optimized Power Distribution To Transport Climate Control Systems Amongst One or More Electric Supply Equipment Stations ", filed Sep. 9, 2019, 41 pages.

European Patent Application No. 19382776.3, titled "Prioritized Power Delivery for Facilitating Transport Climate Control", filed Sep. 9, 2019, 41 pages.

U.S. Appl. No. 16/565,205, titled "Transport Climate Control System With an Accessory Power Distribution Unit for Managing Transport Climate Control Loads", filed Sep. 9, 2019, 57 pages.

U.S. Appl. No. 16/565,235, titled "Interface System for Connecting a Vehicle and a Transport Climate Control System", filed Sep. 9, 2019, 64 pages.

U.S. Appl. No. 16/565,252, titled "Demand-Side Power Distribution Management for a Plurality of Transport Climate Control Systems", filed Sep. 9, 2019, 44 pages.

U.S. Appl. No. 16/565,282, titled "Optimized Power Cord for Transferring Power To a Transport Climate Control System", filed Sep. 9, 2019, 43 pages.

U.S. Appl. No. 16/147,708, titled "Methods and Systems for Autonomous Climate Control Optimization of a Transport Vehicle", filed Sep. 29, 2018, 41 pages.

Extended European Search Report, issued in the corresponding European patent application No. 19382554.4, dated Nov. 29, 2019, 9 pages.

Chinese Office Action issued in corresponding Chinese Patent Application No. 202010594204.8, issued Jun. 5, 2024, 24 pages, English machine translation provided.

* cited by examiner

Prime Mover Power Mode

Shore Power Mode

Holdover Mode

700

900

905

Operate in prime mover power mode

910

Determine deactivation of the prime mover

915

Determining a power setting for the transport climate control unit, relating to maintaining operation or deactivation

920

Operate the transport climate control unit in holdover mode

CLIMATE CONTROLLED VEHICLE, TRANSPORT CLIMATE CONTROL EQUIPMENT, METHOD OF RETROFITTING A VEHICLE AND METHOD OF OPERATION

TECHNICAL FIELD

This disclosure relates generally to energy management of a transport climate control system. More specifically, the disclosure relates to methods and systems for managing multiple energy sources for a transport climate control system.

BACKGROUND

A transport climate control system can include, for example, a transport refrigeration system (TRS) and/or a heating, ventilation and air conditioning (HVAC) system. A TRS is generally used to control an environmental condition (e.g., temperature, humidity, air quality, and the like) within a cargo space of a transport unit (e.g., a truck, a container (such as a container on a flat car, an intermodal container, etc.), a box car, a semi-tractor, a bus, or other similar transport unit). The TRS can maintain environmental condition(s) of the cargo space to maintain cargo (e.g., produce, frozen foods, pharmaceuticals, etc.) In some embodiments, the transport unit can include a HVAC system to control a climate within a passenger space of the vehicle.

SUMMARY

The embodiments described herein can temporarily maintain climate control of an internal space of a transport unit (e.g., cargo space, passenger space, etc) when available energy capacity from a preferred energy source is unavailable.

This disclosure discloses a vehicle electrical system for managing loads and multiple energy sources to allow for management of electrical energy to provide power to a transport climate control unit (also referred to as a HVAC-R system) even if the vehicle power source (for example, the prime mover) is off or unable to fully power the climate control system ("holdover").

In addition, the vehicle electrical system can provide a boost to the vehicle power using an auxiliary energy source (e.g., auxiliary battery) when the vehicle power (for example, from the prime mover) is insufficient.

It will be appreciated that there can be multiple reasons for why the vehicle power source is limited. For example, the vehicle alternator might not be rated for the capacity needed for the loads. Another example is that the vehicle is slowing down (i.e., the vehicle is not running a full speed), and thus the vehicle alternator is not provided by the vehicle a full capacity (for example, the vehicle alternator is provided with 70% or 65% of the rated capacity). For example, the vehicle alternator rated at 100 A can only provide 70 A or 65 A as the vehicle is slowing down. For the vehicle equipped with auto start-stop system (for example, to comply with the EU emission standard), the vehicle can shut down completely when the vehicle comes to a standstill stop (i.e., the vehicle alternator provides no current).

Regulations to reduce emissions (e.g., particulate matter emissions, nitrogen oxide emissions, noise emissions, etc.), for example, from a vehicle prime mover (e.g., a combustion engine such as a diesel engine, etc.), have led to components within the vehicle being electrically driven and the addition of emission reducing components (e.g., emission control devices, an auto start-stop system, etc.) in the space between the vehicle alternator and the prime mover within a vehicle power bay. The auto start-stop system can shut the prime mover off (i.e., the prime mover is not running) when, for example, the vehicle stops at a traffic light, stops at a store, etc. Accordingly, the amount of space between the vehicle alternator and the prime mover in the vehicle power bay that is available for other components is shrinking. For example, this reduced space can make it difficult to provide a separate compressor coupled to (or tied to, mounted to) the prime mover in the vehicle power bay to provide for high cooling power load and supplement a transport climate control system. Further, it may be desirable to provide a transport climate control unit which is physically separate from a vehicle power bay.

The embodiments described herein can provide a transport climate control system that can be electrically driven by the power (for example, a 12V DC power) from the vehicle alternator. Also, the embodiments described herein can help to ensure that power for supply loads (e.g., the transport climate control system) is available as required.

Embodiments described herein can provide climate control within an internal space using a compressor that is disposed outside of the vehicle power bay and is driven by an electric drive. This can prevent the need for a compressor in the vehicle power bay and thereby increase the amount of space available in the vehicle power bay and can allow the separate compressor to operate even when the vehicle prime mover off.

According to a first aspect there is disclosed a climate controlled vehicle comprising:

a prime mover;

a transport climate control unit;

a vehicle power network comprising:

an alternator configured to be driven by the prime mover when the prime mover is active, a primary battery electrically connected to the alternator for charging;

a secondary battery electrically connected to the alternator for charging;

power supply terminals connecting the vehicle power network to the transport climate control unit;

a switch having a closed configuration in which the primary battery and the second battery are electrically coupled to the alternator for charging and an open configuration in which the secondary battery and the power supply terminals are isolated from the primary battery to prevent power supply from the primary battery to the transport climate control unit;

wherein the transport climate control unit is connected to the power supply terminals of the vehicle power network to receive power from the alternator when the prime mover is active and the switch is closed, and to receive power from the secondary battery when the prime mover is inactive and the switch is open; and wherein a controller is configured to determine whether to maintain operation of the transport climate control unit or to deactivate the transport climate control unit, based on a power setting for the transport climate control unit.

Maintaining operation of the transport climate control unit may comprise changing an operating mode of the transport climate control unit. The transport climate control unit may have a standard operating mode and a low power operating mode which is configured to cause lower power consumption than the standard operating mode. The controller may be configured to change the operating mode of the transport climate control unit from the standard operating mode to the
low power operating mode in response to deactivation of the
prime mover.

In the low power operating mode, the controller may
determine whether a power draw of the transport climate
control load network exceeds the amount of power available
from the vehicle electrical system (e.g. from the secondary
vehicle battery when in the holdover mode), and the con-
troller may perform shedding of one or more loads of the
transport climate control load network to reduce the power
draw of the transport climate control load network until the
power draw of the transport climate control load network
matches the power available from the vehicle electrical
system. Shedding one or more loads of the transport climate
control load network may include the controller reducing a
speed of a variable speed compressor of the transport
climate control load network. Shedding one or more loads of
the transport climate control load network may include the
controller stopping operation of at least one of an evaporator
blower, a condenser fan and a heater.

Determining the power draw of the transport climate
control load network, by the controller, may include:

determining one or more loads of the transport climate
control network that are in operation;

accessing a power rating of each of the one or more loads
that are in operation;

adding the power rating of each of the one or more loads
that are in operation to determine the power draw of the
transport load network.

The one or more loads includes a variable speed com-
pressor.

Determining the amount of power available from the
vehicle electrical system, by the controller, may include:

monitoring a current amount supplied to the DC regulated
bus of the vehicle electrical system; and subtracting the power draw of the transport climate con-
trol load network from the current amount supplied to
the DC regulated bus to determine the amount of power
available from the vehicle electrical system.

Determining the amount of power available from the
vehicle electrical system, by the controller, may include
determining a vehicle voltage provided by the vehicle power
network to the DC regulated bus of the vehicle electrical
system and determining the amount of power available from
the vehicle electrical system based on a droop in the vehicle
voltage from an expected vehicle voltage value.

The transport climate control unit may comprise a com-
pressor, and the transport climate control unit may be
configured to operate the compressor at a lower speed in the
low power mode compared with the standard operating
mode at an equivalent operating point of the transport
climate control unit.

The vehicle power network may be configured to auto-
matically open the switch upon deactivation of the prime
mover.

The controller may be configured to receive a user input
to define the power setting. The vehicle may further com-
prise a user input interface to receive user input from a user.
The controller may be configured to cause display of a
prompt to the user to provide user input to define the power
setting, the prompt indicating a first option to maintain
operation of the transport climate control unit and a second
option to deactivate the transport climate control unit.

According to a second aspect, there is provided transport
climate control equipment for a climate controlled vehicle in
accordance with the first aspect, the transport climate control
equipment comprising:

a transport climate control unit configured to be connected
to power supply terminals of the vehicle power network
to receive power from the alternator when the prime
mover is active and the switch is closed, and to receive
power from the secondary batter when the prime mover
is inactive and the switch is open; and a controller configured to determine whether to maintain
operation of the transport climate control unit or to
deactivate the transport climate control unit, based on
a power setting for the transport climate control unit.

The transport climate control unit in accordance with the
second aspect may have any of the features of a transport
climate control unit in accordance with the first aspect. The
controller according to the second aspect may have any of
the features of the transport climate control unit in accor-
dance with the first aspect.

According to a third aspect there is provided a method of
retrofitting a vehicle with a transport climate control unit, the
vehicle comprising:

a prime mover;

a vehicle power network comprising:

an alternator configured to be driven by the prime
mover when the prime mover is active, a primary battery electrically connected to the alterna-
tor for charging;

a secondary battery electrically connected to the alter-
nator for charging;

a switch having a closed configuration in which the
primary battery and the second battery are electri-
cally coupled to the alternator for charging and an
open configuration in which the secondary battery
and the power supply terminals are isolated from the
primary battery to prevent power supply from the
primary battery to the transport climate control unit;

the method comprising:

connecting a transport climate control unit to power
supply terminals of the vehicle power network so that
the transport climate control unit is configured to
receive power from the alternator when the prime
mover is active and the switch is closed, and to receive
power from the secondary battery when the prime
mover is inactive and the switch is open;

providing a controller for the transport climate control
unit which is configured to determine whether to main-
tain operation of the transport climate control unit or to
deactivate the transport climate control unit, upon
deactivation of the prime mover, based on a power
setting for the transport climate control unit.

The controller and/or the vehicle may be configured so
that the retrofitted vehicle has any of the features described
above with respect to the first aspect.

According to a fourth aspect there is provided a method
of operating a climate controlled vehicle comprising:

a prime mover;

a transport climate control unit;

a vehicle power network comprising:

an alternator configured to be driven by the prime
mover when the prime mover is active, a primary battery electrically connected to the alterna-
tor for charging;

a secondary battery electrically connected to the alter-
nator for charging;

power supply terminals connecting the vehicle power
network to the transport climate control unit;

a switch having a closed configuration in which the
primary battery and the second battery are electri-
cally coupled to the alternator for charging and an open configuration in which the secondary battery and the power supply terminals are isolated from the primary battery to prevent power supply from the primary battery to the transport climate control unit the method comprising:

operating the transport climate control unit in a prime mover power mode in which:

the prime mover is active to drive the alternator;

power is supplied from the alternator to operate the transport climate control unit;

optionally power is supplied to charge the primary battery and/or the secondary battery;

a controller determining deactivation of the prime mover;

upon deactivation of the prime mover, the switch moving from the closed configuration to the open configuration;

in response to determining deactivation of the prime mover, determine a power setting for the transport climate control unit corresponding to maintaining operation of the transport climate control unit or deactivation of the transport climate control unit;

based on the power setting, operating the transport climate control unit in a holdover mode in which:

the prime mover is inactive;

power is supplied from the secondary battery to operate the transport climate control unit.

The method may comprise, subsequent to the determined deactivation of the prime mover, receiving user input to define the power setting. The method may further comprise, subsequent to the determined deactivation of the prime mover, displaying a prompt to the user to provide user input via a user input interface to define the power setting, the prompt indicating a first option to maintain operation of the transport climate control unit, and a second option to deactivate the transport climate control unit.

It will be appreciated that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

References are made to the accompanying drawings that form a part of this disclosure and which illustrate embodiments in which the systems and methods described in this specification can be practiced.

Like reference numbers represent like parts throughout.

DETAILED DESCRIPTION

This disclosure relates generally to energy sources and loads management. More specifically, the disclosure relates to methods and systems for managing and controlling auxiliary electrical storage and loads for multiple energy sources for a climate control system.

The embodiments described herein can be provided in, for example, a transport climate control system such as a TRS or MTRS (Multi-Zone Transport Refrigeration System) for a transport unit (TU), an HVAC system for a vehicle, etc.

As defined herein, "low voltage" refers Class A of the ISO 6469-3 in the automotive environment. In particular, a maximum working voltage of between 0V and 60V DC or between 0V and 30V AC.

As defined herein, "high voltage" refers Class B of the ISO 6469-3 in the automotive environment. In particular, a maximum working voltage of between 60V and 1500V DC or between 30V and 1000V AC.

Figure 1:
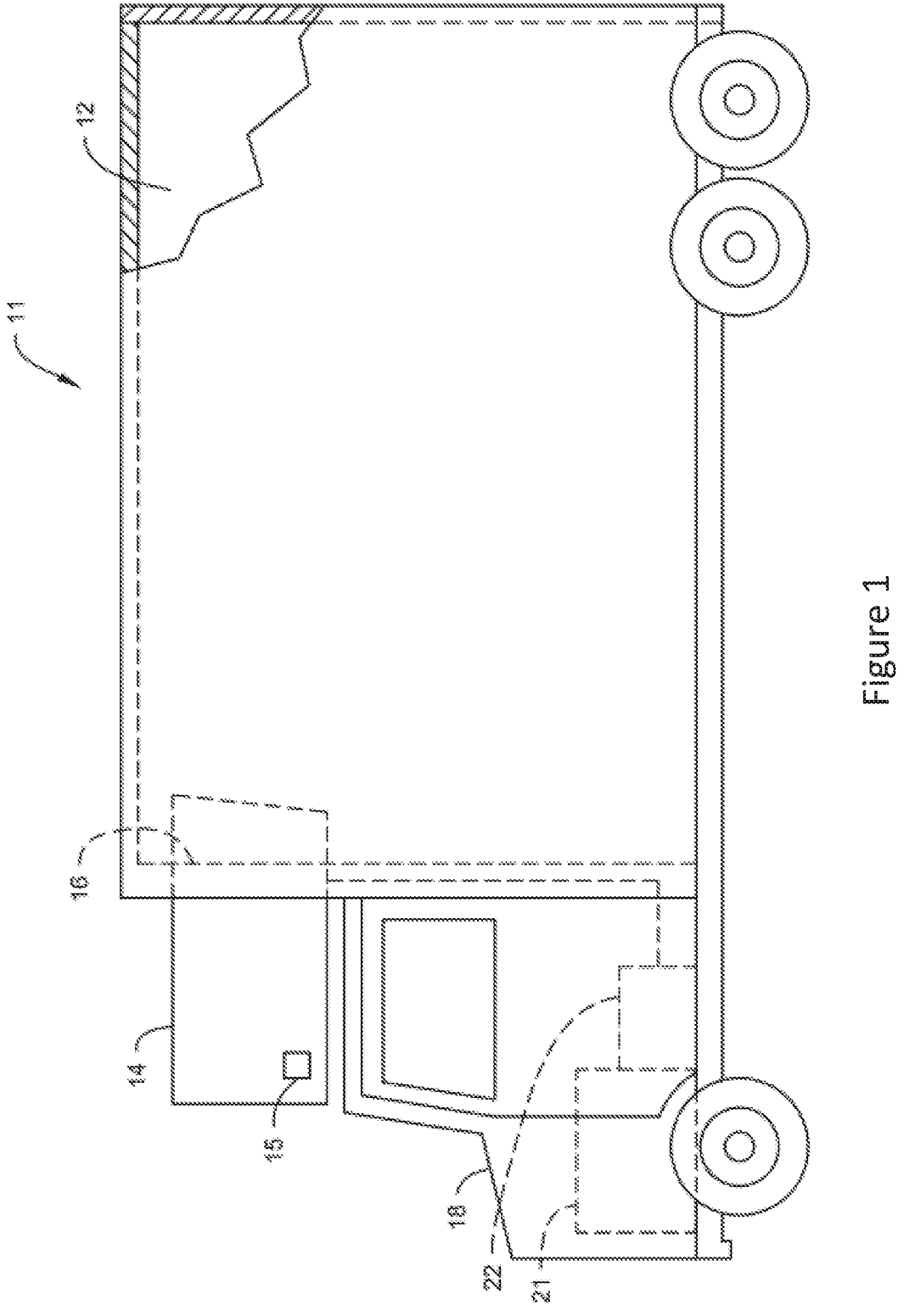
FIG. 1 illustrates a side view of a truck with a front wall mounted vehicle powered transport refrigeration unit.

FIG. 1 depicts a temperature-controlled straight truck 11 that includes a conditioned load space 12 for carrying cargo. A transport climate control unit, in particular a transport refrigeration unit (TRU) 14 is mounted to a front wall 16 of the load space 12. The TRU 14 is controlled via a controller 15 to provide temperature control within the load space 12. The truck 11 further includes a vehicle power bay 18, which houses a prime mover 21, such as a combustion engine (e.g., diesel engine, etc.), that provides power to move the truck 11 and to operate the TRU 14. In this example, the prime mover 21 works in combination with an alternator 22 to operate the TRU 14.

While FIG. 1 illustrates a temperature-controlled straight truck 11, it will be appreciated that the embodiments described herein can also apply to any other type of transport unit including, but not limited to, a container (such as a container on a flat car, an intermodal container, etc.), a box car, or other similar transport unit.

Figure 2:
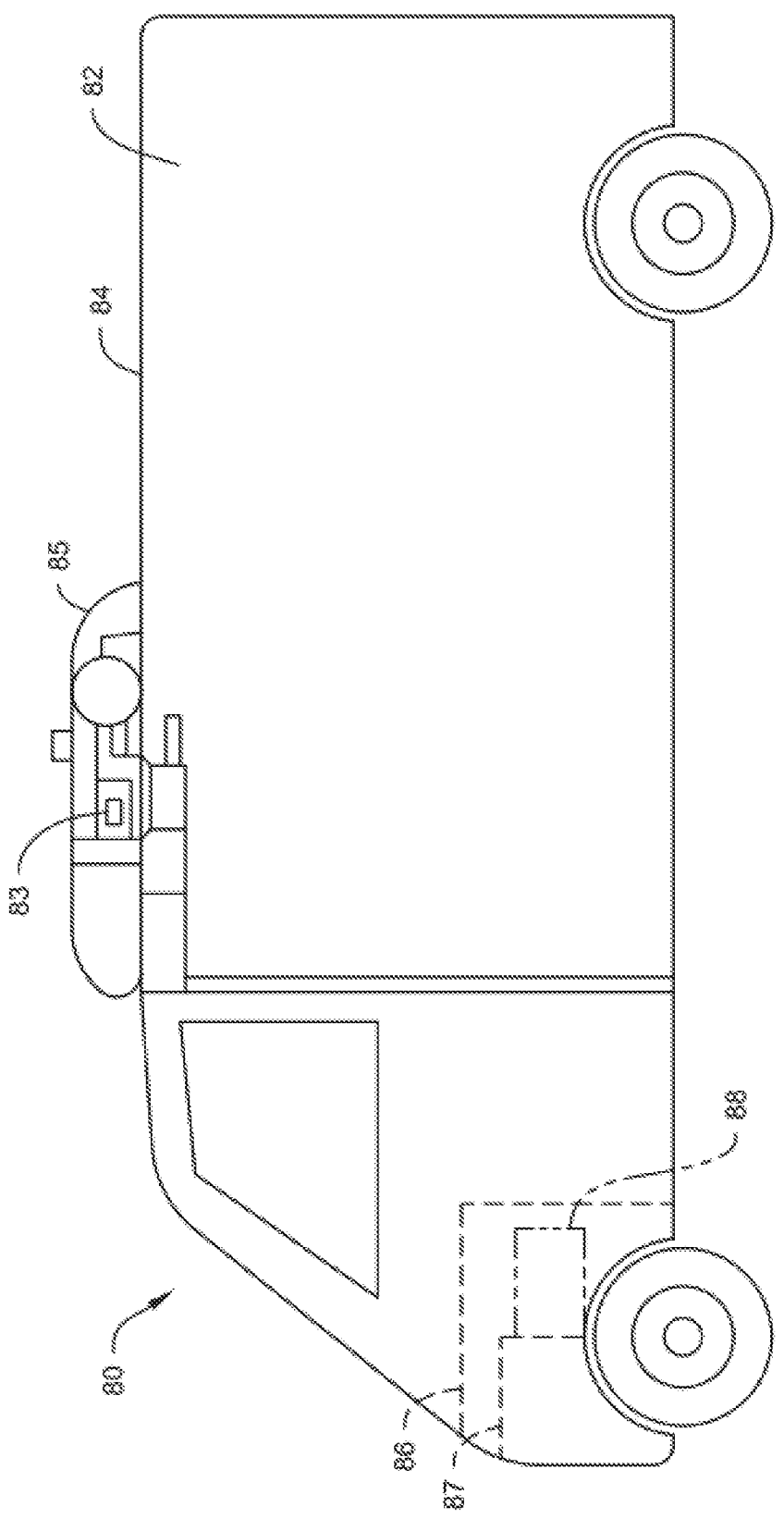
FIG. 2 illustrates a side view of a van with a roof mounted vehicle powered transport refrigeration unit.

FIG. 2 depicts a temperature-controlled van 80 that includes a conditioned load space 82 (or internal space) for carrying cargo. A transport refrigeration unit (TRU) 85 is mounted to a rooftop 84 of the load space 82. The TRU 85 is controlled via a controller 83 to provide temperature control within the load space 82. The van 80 further includes a vehicle power bay 86, which houses a prime mover 87, such as a combustion engine (e.g., diesel engine, etc.), that provides power to move the van 80 and to operate the TRU 85. In this example, the prime mover 87 can work in combination with an alternator 88 to operate the TRU 85. In variants of the example, the van 80 can be a hybrid vehicle that is powered by the prime mover 87 in combination with a battery power source.

It will be appreciated that a TRU is just one example of a transport climate control unit.

Figure 3:
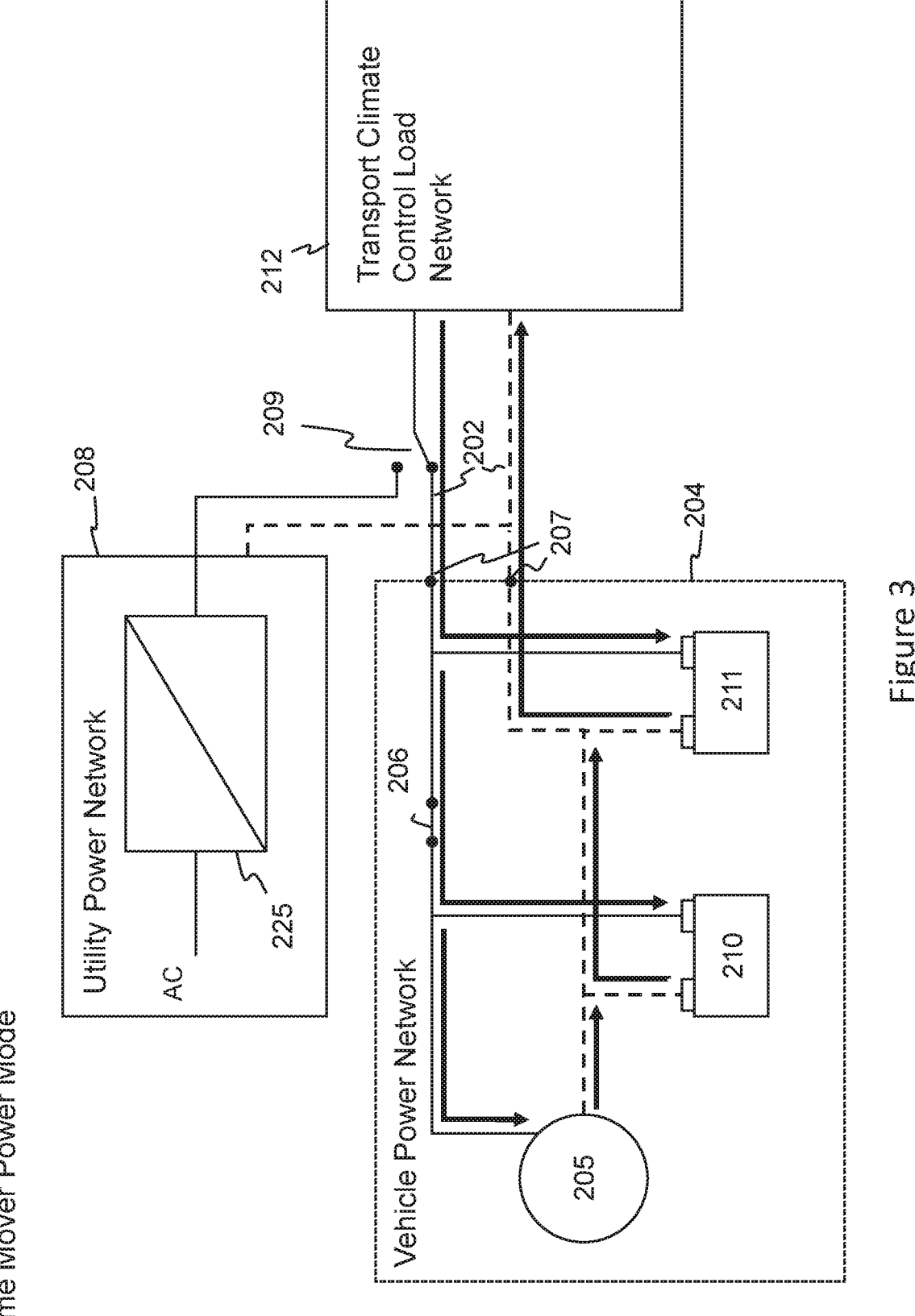
FIGS. 3 to 5 are block diagram schematics of a vehicle electrical system of a climate controlled vehicle.

FIG. 3 illustrates a schematic diagram of a vehicle electrical system 200 of a climate controlled vehicle, such as the truck 11 of FIG. 1 or the van 80 of FIG. 2. The vehicle electrical system 200 can be provided, for example, to supply electrical power to the TRU 14 of FIG. 1 or the TRU 85 of FIG. 2.

The vehicle electrical system 200 shown in FIG. 3 is configured to operate with a prime mover powered vehicle, or a hybrid vehicle powered by a combination of a prime mover and an energy storage device.

As shown in FIG. 3, the vehicle electrical system 200 has three portions that are referred to herein as a vehicle power network 204, a utility power network 208, and a transport climate control load network 212, with the transport climate control load network 212 being connected to the vehicle power network 204 and the utility power network via a DC regulated bus 202. In variants of the example, there may be no utility power network 208. FIG. 3 shows positive and negative power lines of the vehicle electrical system using solid and dashed lines. The DC regulated bus 202 may be a 12 volts DC regulated bus. It will be appreciated that "regulated" is a term of art. For example, a regulated power supply can convert unregulated AC (Alternating Current) supply into a constant DC, with the help of a rectifier (or an AC-DC converter, or the like), and can supply a stable voltage (or current in some situations), to a circuit or device that needs to be operated within certain power supply limits. It will also be appreciated that on a 12 volt regulated bus, the voltage provided to the bus can vary, for example, between about 11 volts to about 15 volts. In some embodiments, the DC regulated bus 202 can travel from a vehicle power bay to a cab of a vehicle and/or to a TRU.

Figure 6:
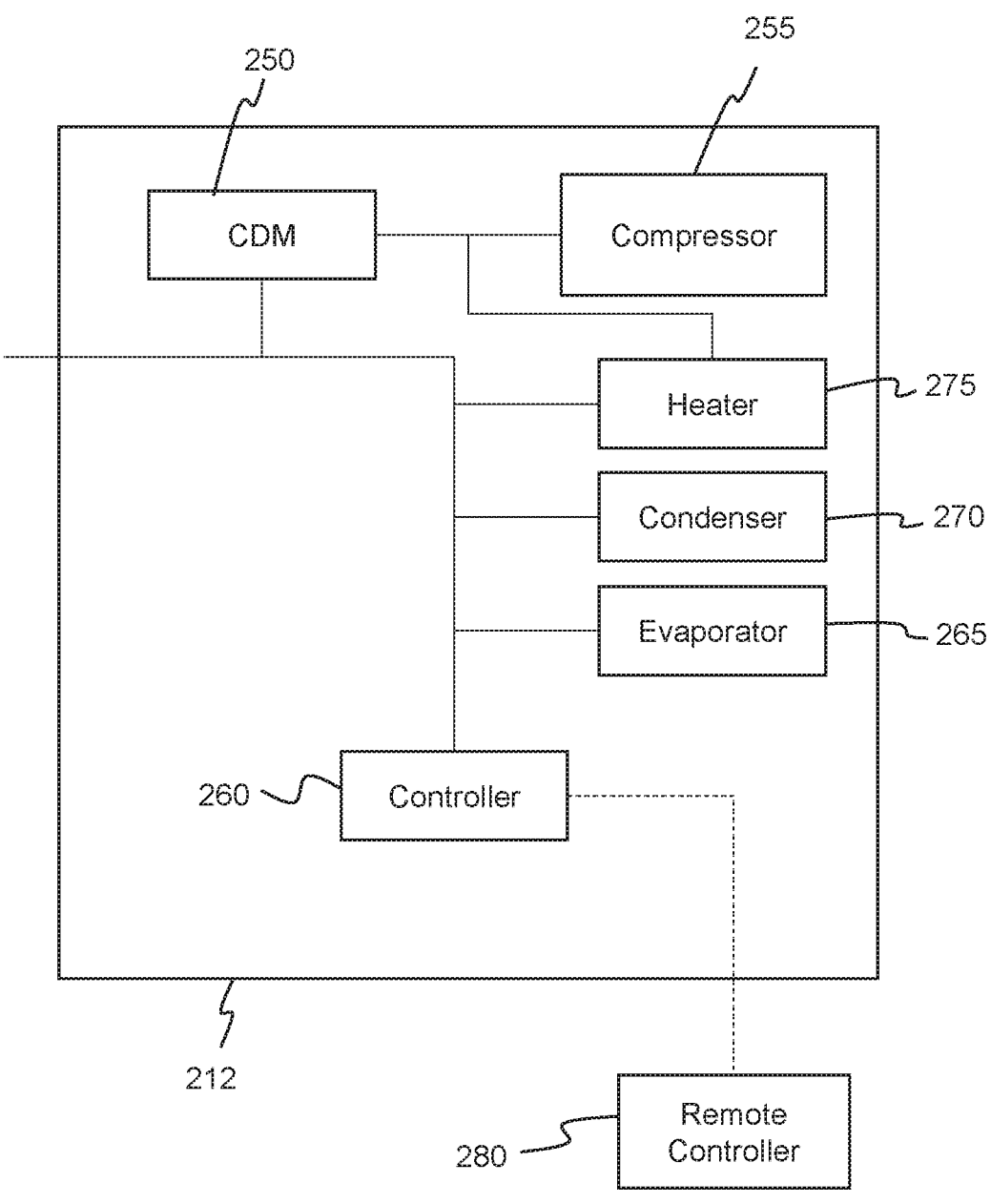
FIG. 6 is a block diagram schematic of a transport climate control load network.

The vehicle electrical system 200 can manage and regulate energy from one or more energy sources from the vehicle power network 204 and the utility power network 208 to the transport climate control load network 212. In this example, the one or more energy sources includes a vehicle alternator 205, a primary vehicle battery 210 and a secondary vehicle battery 211 via the vehicle power network 204, and a utility power (also referred to as a shore power source) via the utility power network 208. Also, the vehicle electrical system 200 is configured to supply energy to one or more loads from the transport climate control load network 212, as best shown in FIG. 6. The loads can be, for example, a compressor 255, one or more evaporator blowers 265, one or more condenser fans 270, a heater 275, and a controller 260 of a transport climate control system.

The vehicle power network 204 includes the vehicle alternator 205, the primary vehicle battery 210 and the secondary vehicle battery 211. In this example, the alternator 205 and the primary and secondary batteries 210, 211 are arranged in parallel with each other such that the primary and secondary batteries 210, 211 are each configured to be charged by energy provided by the alternator 205. The vehicle power network 204 further comprises power terminals 207 in parallel with the secondary vehicle battery 211 for connecting the vehicle power network to the transport climate control load network (e.g. via the DC regulated bus).

The vehicle power network 204 further comprises a battery isolation switch 206 (for example a contactor switch) disposed between the primary vehicle battery 210 and the secondary vehicle battery 211. The battery isolation switch 206 has a closed configuration in which the alternator 205, primary vehicle battery 210, secondary vehicle battery 211 and power supply terminals 207 are electrically coupled (e.g. for charging of the primary and secondary vehicle batteries 210, 211 and for power supply from the vehicle power network to the transport climate control load network 212), and an open configuration in which the secondary battery 211 and the power supply terminals 207 of the vehicle power network 204 are electrically isolated from at least the primary battery 210 (and also from the alternator 205, in this example). Accordingly, in the open configuration of the battery isolation switch 206, power supply from the primary vehicle battery 210 to the transport climate control load network is prevented. In contrast, in the closed configuration, power may be provided from any or all of the alternator 205, the primary vehicle battery 210 and the secondary vehicle battery 211 to the transport climate control load network.

The vehicle alternator 205 can be an electrical alternator that can provide AC power to the vehicle. In some embodiments, the vehicle alternator 205 can include a rectifier or an AC-DC converter (not shown) that rectifies or converts the AC power to a DC power. The vehicle alternator 205 is connected to the DC regulated bus 202 via the battery isolation switch 206. The vehicle alternator 205 can provide the rectified or converted DC power (for example, 12V) to the DC regulated bus 202.

In this example, the vehicle power network is provided on a vehicle as provided by an OEM (Original Equipment Manufacturer), with the primary vehicle battery 210 configured to provide power to key electrical systems of the vehicle such as a starter circuit, and the secondary vehicle battery 211 being provided to supply power to auxiliary systems without risk of draining primary vehicle battery 211 when the prime mover (such as an engine, for example a diesel engine) is deactivated (i.e. inactive) such that the alternator is not generating power. In such systems, the battery isolation switch 206 may be provided on the vehicle as provided by the OEM and may be configured to automatically open upon deactivation of the prime mover (e.g. upon detecting that an ignition switch of the prime mover is turned off). In this example, the transport climate control load network 212 and the utility power network 208 are retrofitted to the OEM vehicle to provide the climate controlled vehicle as described herein. For example, the utility power network 208 and the transport climate control load network 212 may be provided in a transport climate control unit such as a TRU, whereas the vehicle power network may be provided in a power bay of the vehicle, with the DC regulated bus 202 extending between them. In the examples described herein, the transport climate control load network is provided in a transport climate control unit (such as a TRU) to provide the power to the climate control components of the climate control unit (e.g. the compressor, heater, evaporator fan etc.), such that in these examples power supply to the transport climate control load from the vehicle power network is equivalent to power supply to the climate control unit for operation of the climate control unit.

In some embodiments, a voltage sensor (not shown) can be provided in the vehicle power network 204 to monitor a vehicle voltage provided to the DC regulated bus 202, and/or a current sensor (not shown) can be provided to monitor the current to and from the primary vehicle battery 210. Such voltage sensors and/or current sensors may provide a signal to a controller 260 of the transport climate control load network so that it may be determined, based on outputs from the voltage and/or current sensors, whether the prime mover is active (ignition on) or inactive (ignition off), and the controller may control operation of the transport climate control load network based on this determination.

The utility power network 208 includes an AC-DC converter 225. A utility power (e.g. a "mains" power or "shore" power from a ground installation or other power hook up that is external to the vehicle) can be connected to the AC-DC converter 225 to provide AC power input to the AC-DC converter 225. The AC-DC converter 225 converts the AC power from the utility power and provides converted DC power to the DC regulated bus 202. For example, the converted DC power from the AC-DC converter 225 to the DC regulated bus can be 12 volts and 84 amps. While FIG. 3 shows a single AC-DC converter 225, it is appreciated that in variants of the example the vehicle electrical system 200 may include two or more AC-DC converters. In examples where there are two or more AC-DC converters, each of the AC-DC converters may be connected to the utility power to provide additional power capacity to the vehicle electrical system 200.

The utility power network 208 is connected to the DC regulated bus 202 via a switch 209 which has a utility configuration in which the switch connects the utility power network 208 for power supply to the transport climate control load network 212 whilst isolating the vehicle power network from the transport climate control load network 212, and a vehicle power configuration in which the switch connects the vehicle power network 204 to the transport climate control load network 212 whilst isolating the utility power network 208 from the transport climate control load network. FIG. 3 shows the switch 209 in the vehicle power configuration.

In this example, the switch 209 is controlled by a controller 260 of the TRU, as will be described in further detail below. The controller 260 can be, for example, the TRS controller 15 shown in FIG. 1. A remote controller 280 can be connected to the controller 270 wirelessly (e.g., Bluetooth, ZigBee, etc) or via wire (e.g. a communication link such as a RS485 communication link). The remote controller 280 can be located in a cab of the vehicle and can be controlled by a user, for example, a driver. The remote controller may be used by a user to communicate the user's settings for components of the transport climate control load network 212 to the controller 260.

Components of the transport climate control load network 212 can be, for example, part of a transport climate control unit such as a TRU that is mounted to the body of the vehicle (for example, truck). In some embodiments, the TRU can be above the cab of the truck. In another embodiment, the TRU can be on the top of the TU (for example, a top of a box where the external condensers are located). As shown in FIG. 6, the transport climate control load network 212 includes a Compressor Drive Module (CDM) 250 that drives the compressor 255, one or more evaporator blowers 265, one or more condenser fans 270, the heater 275, and the controller 260. The DC regulated bus 202 is connected to and powers each of the CDM 250, the one or more evaporator blowers 265, the one or more condenser fans 270, the heater 275, and the controller 260. It will be appreciated that the CDM 250 and the compressor 255 can require the most power of the various loads of the transport climate control load network 212.

The CDM 250 is configured to boost power from the DC regulated bus 202 and converts the power to AC power to drive the compressor 255. In some embodiments, the CDM 250 can convert the low voltage DC power (for example, 12V) from the DC regulated bus 202 and provide, for example, 240V AC power to drive the compressor 255. In particular, the CDM 250 drives the compressor 255 to meet demand of the transport climate control system.

In some embodiments, the compressor 255 can be a variable speed compressor. In some embodiments, the compressor 255 can require, for example, 1 KW of power to operate. In some embodiments, the one or more evaporator blowers 265 can require, for example, 100 W of power to operate. In some embodiments, the one or more condenser fans 270 can require, for example, 130 W of power to operate. In some embodiments, the heater 275 can require, for example, 1200 W of power to operate. Also, in some embodiments, the heater 275 can be configured to receive power from the CDM 250.

As mentioned above, FIG. 3 shows the vehicle electrical system in a prime mover power mode in which the alternator 205 is driven by a prime mover (such as an engine, such as a diesel engine) of the vehicle to deliver power into the vehicle power network, and in which the vehicle power network provides power to the transport climate control load network 212 via the DC regulated bus 202. In the prime mover power mode, the battery isolation switch 206 is in the closed configuration such that the power terminals 208 of the vehicle power network are electrically coupled to the vehicle alternator 205 and the primary and secondary batteries. In this configuration, the primary and secondary vehicle batteries may be charging, depending on power drawn by the transport climate control load network, or they may be delivering power to the transport climate control load network 212. In the prime mover power mode, the switch 209 is in the vehicle power configuration so as to isolate the utility power network 208 from the transport climate control load network. Example current flows in the prime mover power mode are illustrated by arrows.

Figure 4:
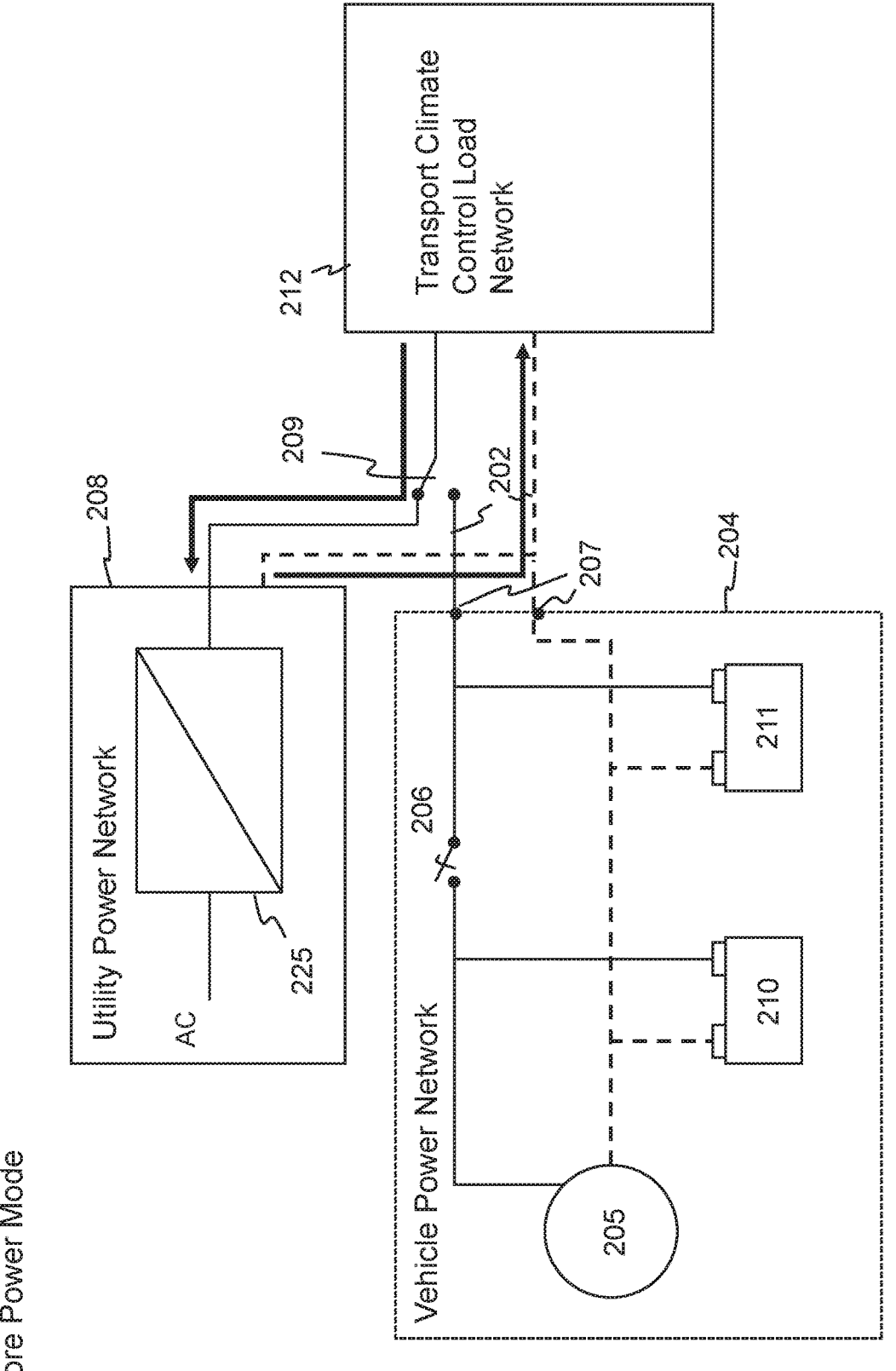

FIG. 4 shows the vehicle electrical system 200 in a shore power mode in which the switch 209 is in the utility configuration so as to electrically couple the utility power network 208 to supply power to the transport climate control load network 212 whilst isolating the transport climate control load network 212 from the vehicle power network 204. In this example, the prime mover is inactive whilst in the shore power mode, such that the battery isolation switch 206 is in the open configuration. Example current flows in the shore power mode are illustrated by arrows.

Figure 5:
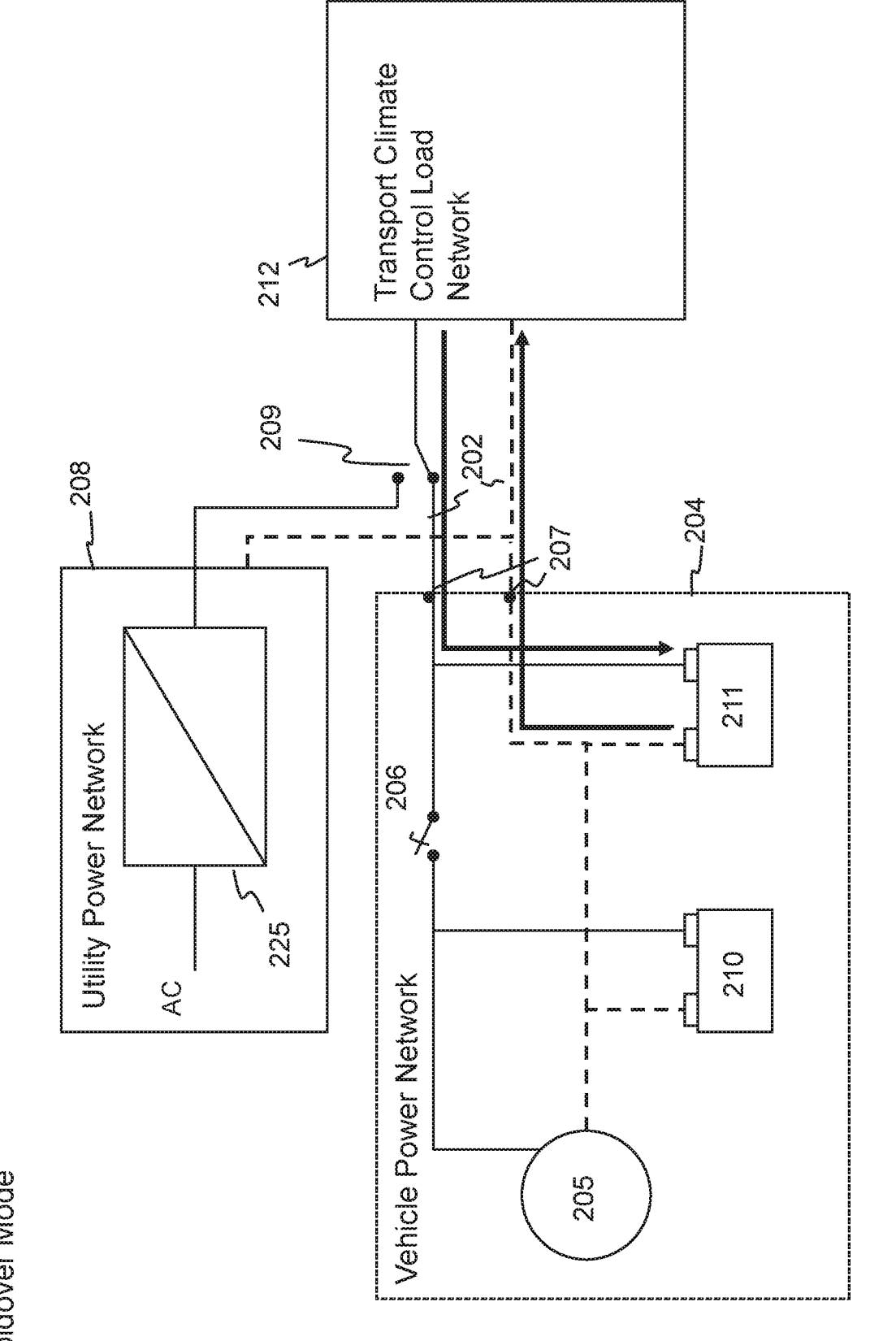

FIG. 5 shows the vehicle electrical system 200 in a holdover mode corresponding to continued operation of the transport climate control load network despite deactivation of the prime mover. In the holdover mode, the switch 209 is in the vehicle power configuration as per the prime mover power mode described above with respect to FIG. 3, and the battery isolation switch 206 is in the open configuration following deactivation of the prime mover. Accordingly, the power supply terminals 207 and the secondary vehicle battery 211 of the vehicle power network 204 are isolated from the primary vehicle battery 210. Example current flows in the holdover mode are illustrated by arrows, indicating power supply from the secondary vehicle battery 211 to the transport climate control load network 212, with no power supply from the primary vehicle battery 210 to the transport climate control load network 212.

Figure 7:
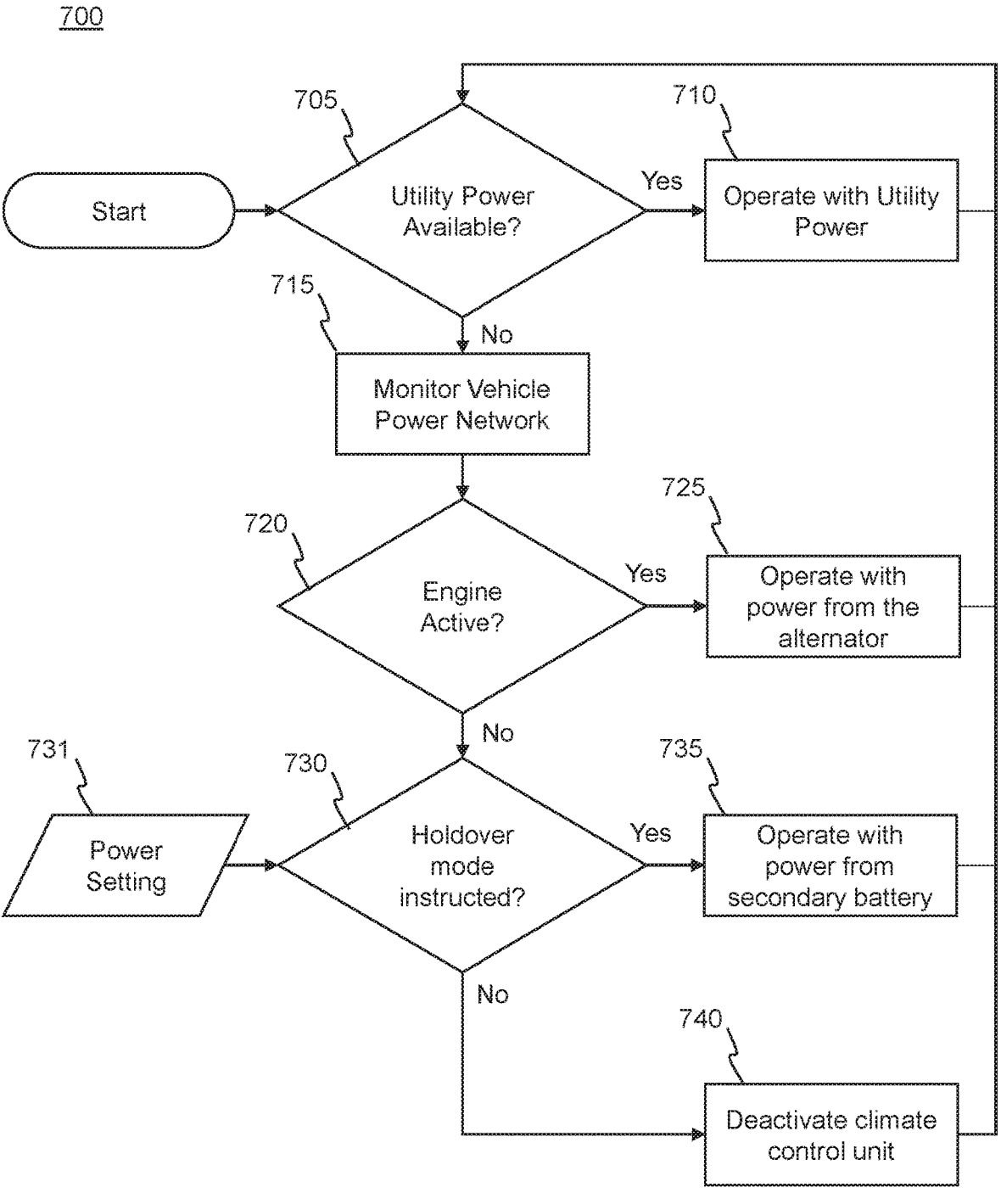
FIG. 7 is a flow diagram of an example method for managing energy to a transport climate control load network from a vehicle electrical system.

FIG. 7 is a flowchart of one example of a method 700 for managing energy to the transport climate control load network from the vehicle electrical system 200 as described above with respect to FIGS. 3-6. The method 700 begins at 705 whereby the controller 260 determines whether the utility power network is connected to utility power for power supply from the utility power to the climate control load network. The controller 260 may determine if the utility power network 208 is permitted to receive power from the utility power. For example, the utility power network 208 may be connected to the utility power but not permitted to receive power from the utility power when, for example, cost of power from the utility power is too expensive, the use of utility power by the vehicle electrical system 200 is being restricted, etc.

If the utility power network 208 is connected to and permitted to receive power from the utility power, the method 700 proceeds to 710. If the utility power network 208 is not connected to the utility power or the utility power network 208 is not permitted to receive power from the utility power, the method 700 proceeds to 715.

At 710, the transport climate control load network 212 is operated in the shore power mode with utility power (i.e. with no power provided from the vehicle power network 204). In particular, the AC-DC converter 225 converts the utility power into DC power that is provided to the DC regulated bus 202.

At 715, the controller 260 monitors an ignition status of the vehicle power network corresponding to whether the ignition of the vehicle is on (i.e. prime mover active) or off (i.e. prime mover inactive/deactivated). The controller 260 may monitor a vehicle voltage or current provided by the vehicle power network 204 to the DC regulated bus 202. A voltage sensor (not shown) may be disposed in the vehicle power network to measure the vehicle voltage. The voltage sensor may then send the vehicle voltage measurement to the controller. Additionally or alternatively, a current sensor (not shown) can be disposed in the vehicle power network 204 to measure current coming into and out of the primary vehicle battery 210. In these embodiments, the current measurements can be sent to the controller 260 in lieu of the vehicle voltage measurement. When retrofitting a climate control unit to a vehicle, the controller maybe connected to monitor the ignition status of the vehicle, for example by monitoring a voltage of the vehicle power network, such as a voltage of an ignition circuit of the vehicle power network. For example, high impedance cables may be installed between the controller and the vehicle power network to send voltage signals to the controller. Additionally or alternatively, a current flow in the vehicle power network may be monitored and communicated to the controller to determine the ignition status based on the voltage and/or current. The method then proceeds to 720.

At 720, the controller 260 determines whether the prime mover is active (ignition on) or inactive (ignition off). If the controller 260 determines that the prime mover is active, then the method proceeds to 725 and the transport climate control load network 212 is operated in the prime mover power mode (i.e. with power from the vehicle power network (725), including power provided from the alternator 205). If the controller 260 determines that the prime mover is inactive (ignition off), then the method proceeds to 730.

At 730, the controller 260 determines whether a holdover mode is instructed based on a power setting 731 for operation of the transport climate control unit. For example, the power setting may be to cause deactivation of the transport climate control unit (i.e. stopping power supply to the climate control components of the transport control unit), or to maintain operation of the transport climate control unit. The power setting may be stored as a predetermined instruction in the controller 260 of the transport climate control unit, or may be received as a user input.

In this example, the controller 260 is configured to receive a user input to define the power setting, subsequent to determining deactivation of the prime mover at 720. In this example, the remote controller 280 is provided in the cab of the vehicle and is configured to provide a user input interface to receive user input from a user, via a display. The controller 260 causes the remote controller 280 to display a prompt to the user to provide user input to define the power setting. For example, the prompt may indicate a first option to maintain operation of the transport climate control unit, and a second option to deactivate the transport climate control unit. Upon receipt of the user input at the remote controller 280, the power setting is defined and the controller 260 determines whether to maintain operation of the transport climate control unit (i.e. operate in the holdover mode, 735) or to deactivate the transport climate control unit (740).

At 735, the controller causes the vehicle electrical system to operate in the holdover mode, by causing or allowing the switch 209 to move to the vehicle power configuration, and controlling the transport climate control unit to draw power from the secondary vehicle battery 211. As described above, with the prime mover deactivated (as determined at 720), the battery isolation switch 206 is automatically moved to the open configuration.

At 740, the controller 260 controls the transport climate control unit to deactivate, by controlling the components of the transport climate control unit to stop drawing power from the vehicle power network 204.

The method returns to 705 after operating the climate control unit as described above with respect to blocks 710, 725, 735 or 740 (deactivation), for example after a predetermined period of time, or upon detection of a change in an ignition status of the prime mover, or a utility power availability.

In this example, the controller 260 is configured to control operation of the transport climate control unit when the vehicle electrical system is operating in the holdover mode to reduce power consumption as compared with operation in the vehicle power mode (and/or the shore power mode). In particular, the controller 260 has a standard operating mode and a low power operating mode which is configured to cause lower power consumption than the standard operating mode for equivalent thermal conditions and set points of the climate transport control unit (i.e. at an equivalent operating point of the transport climate control unit). For example, in the low power operating mode, the controller may be configured to operate the compressor at a lower speed when in the low power mode compared with when in the standard operating mode, at an equivalent operating point of the transport climate control unit. In particular, in the low power operating mode the controller is configured to perform a load shedding process of the transport climate control load network 212 to reduce the amount of energy required by the DC regulated bus 202 and thereby the vehicle power network 204 based on the amount of energy supplied by the vehicle power network 204.

In some embodiments, the controller 260 can instruct the CDM 250 and the compressor 255 to reduce speed in order to reduce the amount of power drawn by the transport climate control load network 212. The amount of speed reduction by the CDM 250 and the compressor 255 can be determined by the controller 260 in order to match or fall below the amount of power available from the vehicle electrical system 200. In some embodiments, the controller 260 can also instruct the one or more evaporator blowers 265, the one or more condenser fans 270 and/or the heater 275 to reduce or stop operation to reduce the amount of power drawn by the transport climate control load network 212. The controller 260 is configured to reduce or stop operation of one or more of the loads of the transport climate control load network 212 in order to match or fall below the amount of power available from the vehicle electrical system 200.

configured to reduce the power draw of the transport climate control load network until the power draw of the transport climate control load network matches the power available from the vehicle electrical system in the holdover mode (i.e. as supplied from the secondary vehicle battery 211, which has a limited power supply capacity).

Figure 8:
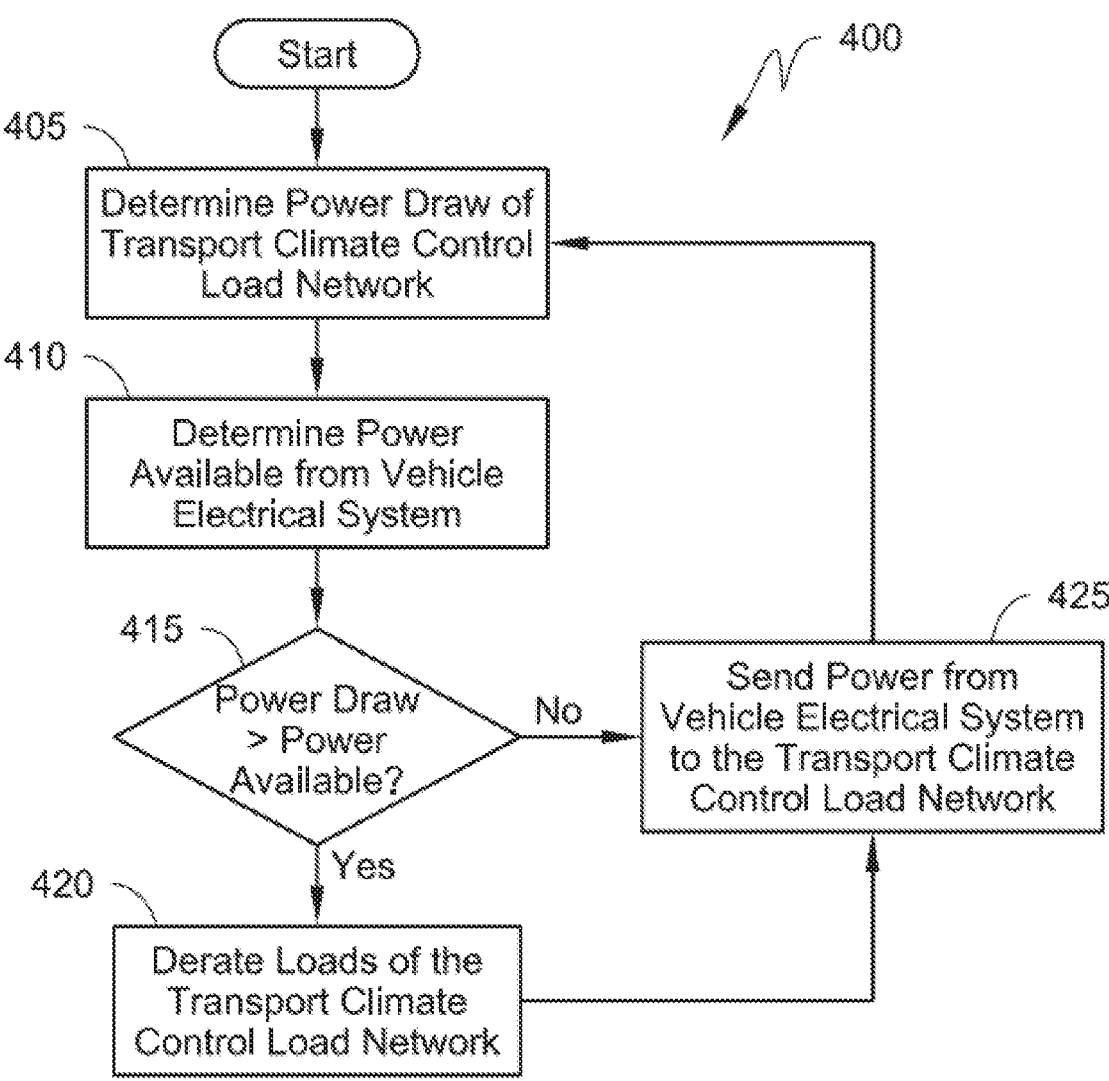
FIG. 8 is a flow diagram of an example method of load management to a transport climate control load network from a vehicle electrical system.

FIG. 8 is a flow diagram of an example method 400 of a method of load management of a transport climate control load network using the vehicle electrical system 200 as described above. The method of load management may be employed whether the transport climate control load network is being supplied with power in the prime mover power mode, the utility power mode, or the holdover mode. As described above, the power availability may be reduced in the holdover mode as compared with the utility mode and the prime mover power mode, such that in this example the controller is configured to conduct the method 400 upon initiation of the holder mode, in order to determine whether to move from a standard operating mode (i.e. operating the transport climate control load network at full capacity to meet the operational demands of the controlled spaced), or in a low power mode to preserve and extend the life of the secondary vehicle battery.

The method 400 begins at 405 where the controller 260 determines a power draw of the transport climate control load network 212.

In some embodiments, the controller 260 can store in memory a power rating (i.e., the amount of power used by a component when operating) for each component of the transport climate control load network 212. The controller 260 can monitor the transport climate control load network 212 to determine which components of the transport climate control load network 212 are operating. The controller 260 can access the power rating of those components of the transport climate control load network 212 that are operating and calculate the power draw of the transport climate control load network 212.

In other embodiments, a current sensor can be disposed in the vehicle power network 204 to measure current being sourced by the vehicle electrical system 200 to the load transport climate control load network 212. In these embodiments, the current measurements can be sent to the controller 260. Based on the current measurement, the controller 260 can determine the power draw of the power transport climate control load network 212. The method 400 then proceeds to 410.

In yet some other embodiments, the controller 260 can determine a power draw of the transport climate control load network 212 based on an operational gap of the transport climate control system. For example, a temperature sensor can monitor an internal space temperature of an internal space (e.g., the load space 12 shown in FIG. 1) of a transport unit that is conditioned using the transport climate control system. The controller 260 then compares the monitored internal space temperature with a desired setpoint temperature of the internal space to obtain an operational gap between the monitored internal space temperature and the desired setpoint temperature. In some embodiments, the operational gap is an absolute difference between the internal space temperature and the desired setpoint temperature of the internal space. Based on the operational gap and the type of cargo stored in the transport unit, the controller 260 can determine the power draw of the transport climate control load network 212.

In some embodiments, the controller 260 can use a lookup table or a set of equations to determine the power draw based on the type of cargo stored in the transport unit. In some embodiments, the controller 260 can make use of operational status data of the transport climate control system (e.g, which loads of the transport climate control load network 212 are used when performing specific operation modes of the transport climate control system, etc.) to determine the power draw. Also, in some embodiments, the controller 260 can make use of other data (e.g., weather data, driving data, etc.) to determine the power draw.

It will be appreciated that the urgency in closing the operational gap can vary based on the type of cargo stored in the transport unit. For example, there may be a higher urgency in keeping the operational gap small when the cargo is a pharmaceutical cargo than when the cargo is a frozen cargo.

At 410, the controller 260 determines an amount of power available from the vehicle electrical system 200. The controller 260 can determine the amount of power available from the vehicle power network 204 based on the vehicle voltage provided by the vehicle power network 204 to the DC regulated bus 202. When one or more loads of the transport climate control network 212 are requiring more power than what is available, e.g. from the secondary vehicle battery 211 (when the vehicle electrical system 200 is operating in holdover mode), or from the alternator 205 of the vehicle power network 204 when in prime mover power mode, the vehicle voltage has been found to droop from an expected vehicle voltage value. The amount of power available from the vehicle power network 204 can be determined based on the droop in the vehicle voltage. In some embodiments, a voltage sensor is disposed in the vehicle power network 204 to measure the vehicle voltage. The voltage sensor then sends the vehicle voltage measurement to the controller 260.

In some embodiments, the controller 260 determines the amount of power available from the vehicle power network 204 to supply power to the DC regulated bus 202. As discussed above, the controller 260 can determine the amount of power available from the vehicle power network 204 using the vehicle voltage provided by the vehicle power network 204 to the DC regulated bus 202.

In some embodiments, the controller 260 determines the amount of power available from the utility power network 208 being used to supply power to the DC regulated bus 202 when the utility power network 208 is supplying power to the vehicle electrical system 200.

At 415, the controller 260 determines whether the power draw of the transport climate control load network 212 exceeds the amount of power available from the vehicle electrical system 200. If the amount of power draw of the transport climate control load network 212 exceeds the amount of power available from the vehicle electrical system 200, the method 400 proceeds to 420. If the amount of power draw of the transport climate control load network 212 does not exceed the amount of power available from the vehicle electrical system 200, the method 400 proceeds to 425.

At 420, the controller 260 is configured to derate one or more loads of the transport climate control load network 212 in order to reduce the power draw of the transport climate control load network 212. That is, the controller 260 can perform a load shedding process of the transport climate control load network 212 to reduce the amount of energy required by the DC regulated bus 202 and thereby the vehicle power network 204 based on the amount of energy supplied by the vehicle power network 204.

In some embodiments, the controller 260 can instruct the CDM 250 and the compressor 255 to reduce speed in order to reduce the amount of power drawn by the transport climate control load network 212. The amount of speed reduction by the CDM 250 and the compressor 255 can be determined by the controller 260 in order to match or fall below the amount of power available from the vehicle electrical system 200. In some embodiments, the controller 260 can also instruct the one or more evaporator blowers 265, the one or more condenser fans 270 and/or the heater 275 to reduce or stop operation to reduce the amount of power drawn by the transport climate control load network 212. The controller 260 is configured to reduce or stop operation of one or more of the loads of the transport climate control load network 212 in order to match or fall below the amount of power available from the vehicle electrical system 200.

At 425, the controller 260 is configured to operate the vehicle electrical system 200 to draw power for the transport climate control load network 212 from the vehicle power network 204.

The method 400 then returns to 405.

Figure 9:
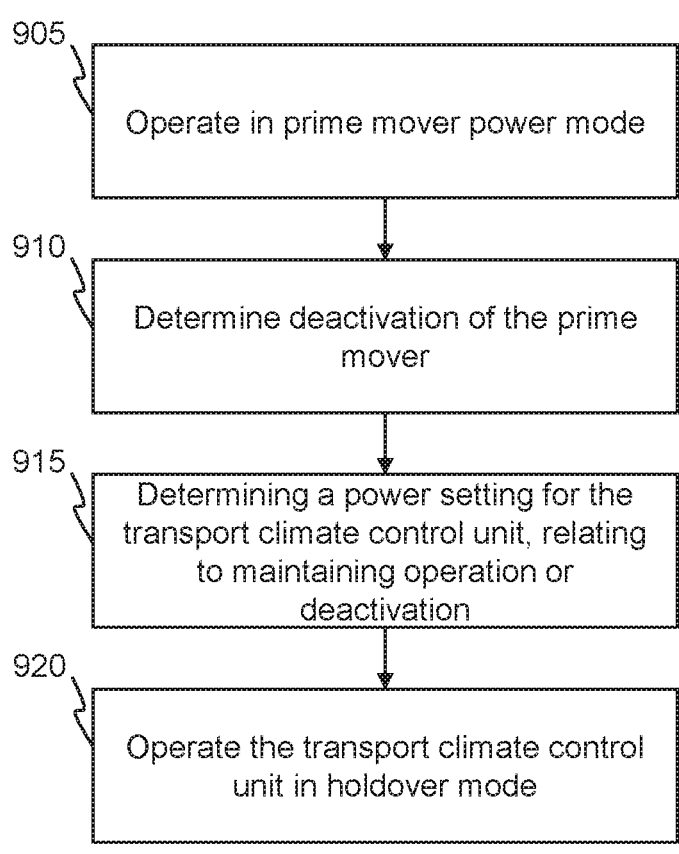
FIG. 9 is a flow diagram of an example method of operating a climate controlled vehicle.

FIG. 9 is a flow diagram of an example method 900 of operating a climate controlled vehicle, such as a climate controlled vehicle as described herein with reference to FIGS. 1-6, and which will be described by reference to the vehicle electrical system 200 of FIGS. 3-5. In block 905, the vehicle electrical system 200 is operated in the prime mover power mode as described above with respect to FIG. 3. In block 910, the controller 260 subsequently determines deactivation of the prime mover as described above (for example, based on monitoring a voltage in the vehicle power network, such as a voltage across terminals of an ignition circuit connected to the primary vehicle battery 210). In block 915, the controller determines a power setting for the transport climate control unit (e.g. a value of the power setting is detected or observed), for example as described above with respect to block 730 of FIG. 7. In this example, it is determined that the power setting corresponds to continued operation of the transport climate control unit despite deactivation of the prime mover. Accordingly, in block 920, the transport climate control unit is controlled to operate in the holdover mode, as described above with respect to FIGS. 5, 7 and 8.

In the examples described above, the controller 260 may be configured to send an alert, for example, to the user (e.g., vehicle driver), the cargo customer, etc. that there may be an energy scarcity of the vehicle electrical system 200. The alert can be sent via a SMS message, an email, can be displayed to the vehicle driver via the remote controller 280, etc. The alert may instruct the driver to start the vehicle and run at a fast idle (e.g., raise an idle speed of a prime mover of the vehicle without raising a speed at which the vehicle is moving) or downshift a vehicle prime mover to operate at a higher prime mover RPM so as to prevent a failure of the transport climate control system and to prevent shedding or derating of loads of the transport climate control load network 212. The controller 260 may be configured to instruct the vehicle to start an automatic restart module to start the vehicle and run at a fast idle to prevent failure of the transport climate control system and to prevent shedding or derating of loads of the transport climate control load network 212. The controller 260 may be configured to instruct the vehicle to disable an auto start/stop system of the vehicle prime mover. In some embodiments, the alert can be sent a time period (e.g., 1 to 5 minutes) before any action is taken or required.

In the examples described above, the controller 260 may determine whether the vehicle electrical system 200 should shut off power to the transport climate control load network 212 based on the vehicle voltage provided by vehicle power network 204. That is, the controller 260 may determine whether the DC regulated bus 202 should be prevented from receiving energy from the vehicle power network 204, and, when applicable, the utility power network 208 and sending said energy to the components of the transport climate control load network 212. The vehicle electrical system 200 should shut off power to the transport climate control load network 212 when, for example, there is insufficient power available to power the transport climate control network 212 or could harm operation of the vehicle. The controller 260 may be configured to determine that the vehicle electrical system 200 should shut off power to the transport climate control load network 212 when a voltage of the vehicle power network voltage is less than a shut off threshold. For example, when the DC regulated bus 202 is a 12 volt regulated bus, the controller 260 can determine that the vehicle electrical system 200 should shut off power to the transport climate control load network 212 when the vehicle voltage provided by the vehicle power network 204 is less than the shut off threshold that is, for example, about 11.5 volts. The controller 260 may be configured so that, if it determines that the vehicle electrical system 200 should shut off power to the transport climate control load network 212, the controller 260 shuts off power from the vehicle electrical system 200 to the transport climate control load network 212. The controller 260 may be configured to control the AC-DC converter 225 so as to prevent power from the utility power.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts, without departing from the scope of the present disclosure. The word "embodiment" as used within this specification may, but does not necessarily, refer to the same embodiment. This specification and the embodiments described are examples only. Other and further embodiments may be devised without departing from the basic scope thereof, with the true scope and spirit of the disclosure being indicated by the claims that follow.

The invention claimed is:

1. A climate controlled vehicle comprising:
   a prime mover;
   a transport climate control unit;
   a vehicle power network comprising:
      an alternator configured to be driven by the prime mover when the prime mover is active,
      a primary battery electrically connected to the alternator for charging;
      a secondary battery electrically connected to the alternator for charging, wherein the alternator and the primary and secondary batteries are arranged in parallel with each other;
      power supply terminals connecting the vehicle power network to the transport climate control unit, wherein the power supply terminals are arranged in parallel with the secondary battery;
      a switch having a closed configuration in which the primary battery and the second battery are electrically coupled to the alternator for charging and an open configuration in which the secondary battery and the power supply terminals are isolated from the primary battery and the alternator to prevent power supply from the primary battery and the alternator to the transport climate control unit;
   wherein the transport climate control unit is connected to the power supply terminals of the vehicle power network to receive power from the alternator, the primary battery, and/or the secondary battery when the prime mover is active and the switch is closed, and to receive power from the secondary battery when the prime mover is inactive and the switch is open; and wherein a controller is configured to determine whether to maintain operation of the transport climate control unit or to deactivate the transport climate control unit, upon determining deactivation of the prime mover, based on a power setting for the transport climate control unit.

2. A climate controlled vehicle according to claim 1, wherein maintaining operation of the transport climate control unit comprises changing an operating mode of the transport climate control unit, wherein the transport climate control unit has a standard operating mode and a low power operating mode which is configured to cause lower power consumption than the standard operating mode, wherein the controller is configured to change the operating mode of the transport climate control unit from the standard operating mode to the low power operating mode in response to deactivation of the prime mover.

3. A climate controlled vehicle according to claim 2, wherein the transport climate control unit comprises a compressor, and wherein the transport climate control unit is configured to operate the compressor at a lower speed in the low power mode compared with the standard operating mode at an equivalent operating point of the transport climate control unit.

4. A climate controlled vehicle according to claim 1, wherein the vehicle power network is configured to automatically open the switch upon deactivation of the prime mover.

5. A climate controlled vehicle according to claim 1, wherein the controller is configured to receive a user input to define the power setting.

6. A climate controlled vehicle according to claim 5, further comprising a user input interface to receive user input from a user, and wherein the controller is configured to cause display of a prompt to the user to provide user input to define the power setting, the prompt indicating a first option to maintain operation of the transport climate control unit and a second option to deactivate the transport climate control unit.

7. Transport climate control equipment for a climate controlled vehicle, the climate controlled vehicle comprising:

a prime mover;

a vehicle power network comprising:

an alternator configured to be driven by the prime mover when the prime mover is active, a primary battery electrically connected to the alternator for charging;

a secondary battery electrically connected to the alternator for charging, wherein the alternator and the primary and secondary batteries are arranged in parallel with each other;

power supply terminals for connecting the vehicle power network to a transport climate control unit, wherein the power supply terminals are arranged in parallel with the secondary battery;

a switch having a closed configuration in which the primary battery and the second battery are electrically coupled to the alternator for charging and an open configuration in which the secondary battery and the power supply terminals are isolated from the primary battery and the alternator to prevent power supply from the primary battery and the alternator to the transport climate control unit;

the transport climate control equipment comprising:

the transport climate control unit configured to be connected to the power supply terminals of the vehicle power network to receive power from the alternator, the primary battery, and/or the secondary battery when the prime mover is active and the switch is closed, and to receive power from the secondary battery when the prime mover is inactive and the switch is open; and a controller configured to determine whether to maintain operation of the transport climate control unit or to deactivate the transport climate control unit, upon determining deactivation of the prime mover, based on a power setting for the transport climate control unit.

8. Transport climate control equipment according to claim 7, wherein maintaining operation of the transport climate control unit comprises changing an operating mode of the transport climate control unit, wherein the transport climate control unit has a standard operating mode and a low power operating mode which is configured to cause lower power consumption than the standard operating mode, wherein the controller is configured to change the operating mode of the transport climate control unit from the standard operating mode to the low power operating mode in response to deactivation of the prime mover.

9. Transport climate control equipment according to claim 7, wherein the transport climate control unit comprises a compressor, and wherein the transport climate control unit is configured to operate the compressor at a lower speed in the low power mode compared with the standard operating mode at an equivalent operating point of the transport climate control unit.

10. Transport climate control equipment according to claim 7, wherein the controller is configured to receive a user input to define the power setting.

11. Transport climate control equipment according to claim 10, further comprising a user input interface to receive user input from a user, and wherein the controller is configured to cause display of a prompt to the user to provide user input to define the power setting, the prompt indicating a first option to maintain operation of the transport climate control unit and a second option to deactivate the transport climate control unit.

12. A climate controlled vehicle comprising:

a prime mover;

a transport climate control unit;

a vehicle power network comprising:

an alternator configured to be driven by the prime mover when the prime mover is active, a primary battery electrically connected to the alternator for charging;

a secondary battery electrically connected to the alternator for charging, wherein the alternator and the primary and secondary batteries are arranged in parallel with each other;

power supply terminals connecting the vehicle power network to the transport climate control unit, wherein the power supply terminals are arranged in parallel with the secondary battery;

a switch having a closed configuration in which the primary battery and the second battery are electrically coupled to the alternator for charging and an open configuration in which the secondary battery and the power supply terminals are isolated from the primary battery and the alternator to prevent power supply from the primary battery and the alternator to the transport climate control unit; and a further switch having a utility configuration in which the vehicle power network is isolated from the transport climate control unit by the further switch and a vehicle power configuration in which the vehicle power network is coupled to the transport climate control unit via the further switch;

wherein the transport climate control unit is connected to the power supply terminals of the vehicle power network to receive power from the alternator, the primary battery, and/or the secondary battery when the prime mover is active and the switch is closed, and to receive power from the secondary battery when the prime mover is inactive and the switch is open; and wherein a controller is configured to determine whether to maintain operation of the transport climate control unit or to deactivate the transport climate control unit, upon determining deactivation of the prime mover, based on a power setting for the transport climate control unit.

13. A method of operating a climate controlled vehicle comprising:

a prime mover;

a transport climate control unit;

a vehicle power network comprising:

an alternator configured to be driven by the prime mover when the prime mover is active, a primary battery electrically connected to the alternator for charging;

a secondary battery electrically connected to the alternator for charging, wherein the alternator and the primary and secondary batteries are arranged in parallel with each other;

power supply terminals connecting the vehicle power network to the transport climate control unit, wherein the power supply terminals are arranged in parallel with the secondary battery;

a switch having a closed configuration in which the primary battery and the second battery are electrically coupled to the alternator for charging and an open configuration in which the secondary battery and the power supply terminals are isolated from the primary battery and the alternator to prevent power supply from the primary battery and the alternator to the transport climate control unit;

wherein the transport climate control unit is connected to the power supply terminals of the vehicle power network to receive power from the alternator, the primary battery, and/or the secondary battery when the prime mover is active and the switch is closed, and to receive power from the secondary battery when the prime mover is inactive and the switch is open;

the method comprising:

operating the transport climate control unit in a prime mover power mode in which:

the prime mover is active to drive the alternator;

power is supplied from the alternator to operate the transport climate control unit;

optionally power is supplied to charge the primary battery and/or the secondary battery;

a controller determining deactivation of the prime mover;

upon deactivation of the prime mover, the switch moving from the closed configuration to the open configuration;

in response to determining deactivation of the prime mover, determine a power setting for the transport climate control unit corresponding to maintaining operation of the transport climate control unit or deactivation of the transport climate control unit;

based on the power setting, operating the transport climate control unit in a holdover mode in which:

the prime mover is inactive;

power is supplied from the secondary battery to operate the transport climate control unit.

14. A method according to claim 13, further comprising:

subsequent to the determined deactivation of the prime mover, receiving user input to define the power setting.

15. A method according to claim 14, further comprising:

subsequent to the determined deactivation of the prime mover, displaying a prompt to the user to provide user input via a user input interface to define the power setting, the prompt indicating a first option to maintain operation of the transport climate control unit, and a second option to deactivate the transport climate control unit.

* * * * *